United States Patent [19]
Kronogard

[11] 3,956,899
[45] May 18, 1976

[54] GAS TURBINE PLANT WHERE A CIRCULATING MEDIUM IS INDIRECTLY HEATED

[75] Inventor: Sven-Olof Kronogård, Lomma, Sweden

[73] Assignee: United Turbine AB & Co., Kommanditbolag, Malmo, Sweden

[22] Filed: Oct. 16, 1974

[21] Appl. No.: 515,173

[52] U.S. Cl. ................................................. 60/682
[51] Int. Cl.² ............................................. F01K 25/10
[58] Field of Search ............ 60/643, 645, 650, 651, 60/670, 671, 682, 644

[56] References Cited
UNITED STATES PATENTS

| | | | |
|---|---|---|---|
| 3,477,228 | 11/1969 | Johnson | 60/682 |
| 3,623,325 | 11/1971 | Jubb et al. | 60/644 |
| 3,742,707 | 7/1973 | Andrews et al. | 60/644 |

*Primary Examiner*—Allen M. Ostrager
*Attorney, Agent, or Firm*—Holman & Stern

[57] ABSTRACT

The invention relates to improvements in gas turbine plants by encapsulating the compressor and turbine means in a pressure proof casing, and by arranging the hot and cold process sections, respectively, at opposite ends of the casing, the power output shaft can be arranged in the cold section; the arrangement also permits excellent noise insulation possibilities, by arranging the output power means, e.g. an electrical generator or a hydraulic pump within the casing, rotating shaft sealing problems are eliminated.

3 Claims, 4 Drawing Figures

GAS TURBINE PLANT WHERE A CIRCULATING MEDIUM IS INDIRECTLY HEATED

FIELD OF THE INVENTION

The present invention relates to gas turbine plants of the closed cycle type and being suited for particular automotive, marine, military or industrial applications where low noise level and low emission of exhaust gases are required. Such a plant is particularly suited for installations where it is easy to provide heat or where heat can be obtained from exhaust gases from industrial processes, or is particularly suited in connection with gas cooled nuclear reactors or smaller isotope reactors and heat accumulators, respectively.

SUMMARY OF THE INVENTION

It is the purpose of the invention to construct the plant in such a way that the rotating elements are completely encapsulated in a casing which permits easy mounting, and further, it is the purpose of the invention to construct the casing so that the hottest section is located at one end of the casing, the power output section being located at the opposite end of the casing. Further, the casing is so formed that a closed circuit flow path having a minimum of power losses is obtained. According to a further development of the invention, the power output is obtained electrically or by means of pressurized fluid, the power generating parts being encapsulated in the casing; this means that the difficult problems of sealing in connection with a reciprocating or rotating shaft extending out from a high pressure space are eliminated. In connection with plants where the load, torque and rpm vary considerably, it is highly desirable that change of torque and the losses pertaining thereto be carried out in the circuit path, where said losses are small in contrast to external transmission systems so that energy can be recovered up to about 80 to 90% in a heat exchanger. Further objects and advantages of the invention will become apparent from the following description of exemplary embodiments when taken in connection with the drawing.

The invention will now be described with reference to the attached drawings, as follows:

DESCRIPTION OF THE PREFERRED EMBODIMENTS

Figure 1:
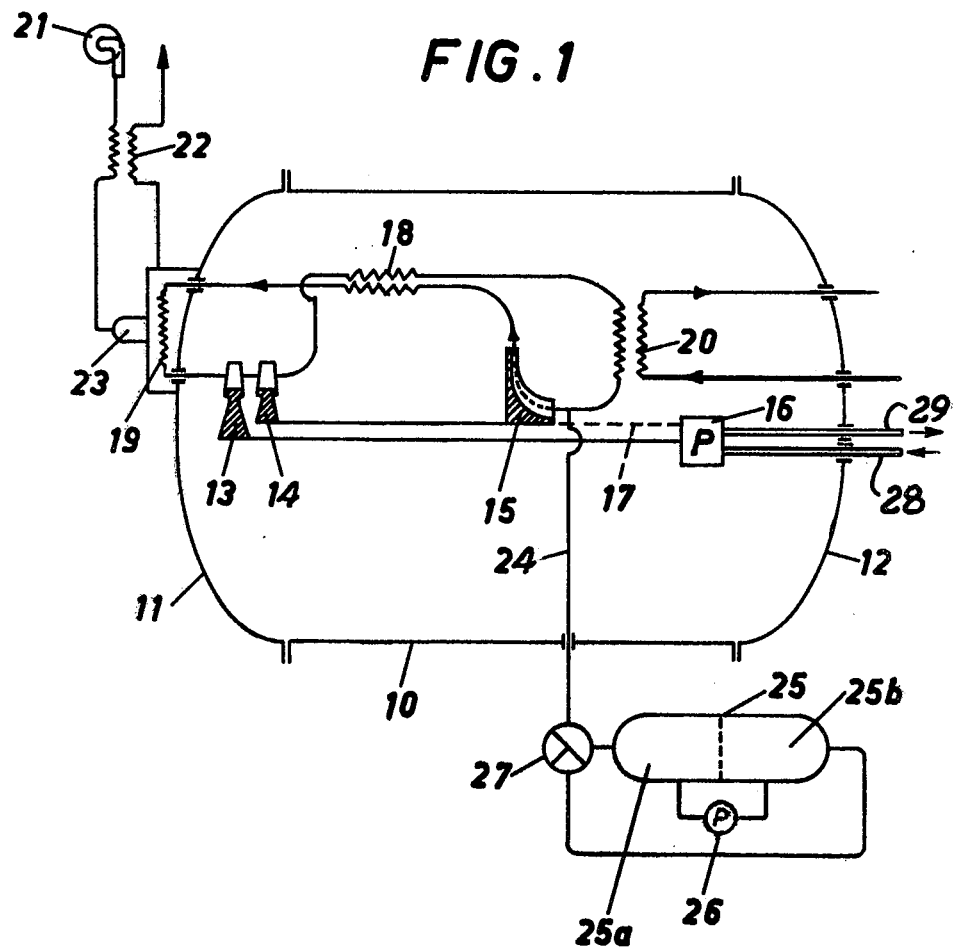
FIG. 1 schematically illustrates the principals of the invention in a turbine plant system.

In the embodiment shown in FIG. 1, the main components are encapsulated in a pressure resistant casing, comprising a cylindrical main part 10 and two domed gables caps on ends 11 and 12. A gas turbine comprising two rotors 13 and 14 and a compressor 15 is mounted within said casing. The rotor 13 drives a hydraulic pump 16 and the rotor 14 drives said compressor, but it is to be understood that both turbine rotors can be connected to the pump or can be connected to two parallel connected pump units, respectively, as has been suggested by a dashed line 17, so that, when it is required, power can be transferred from the turbine means in order to quickly accelerate the compressor or for driving the output load via the pump of the hydraulic system or an electrical generator and the motor means pertaining thereto.

A gaseous medium (for instance air, helium or hydrogen) is circulated in a closed path through the turbine and compressor and is fed through a number of heat exchangers.

The circulating medium is compressed by the compressor 15 and is fed through a first heat exchanger 18 where the exhaust losses of the turbine are used, and is then fed out from the actual casing to a second heat exchanger 19 where said medium is heated further. Thereafter, the medium is fed back into the casing, is allowed to expand in the turbines 13, 14, passes through the first heat exchanger 18 and is finally led through a cooler 20 before it is again led into the compressor. The process or cycle shows that it is essential that the transmission losses occur in the turbine system as discharge losses which can be recovered up to 80 to 90% in a heat exchanger, and do not occur in a hydraulic or transmission system where they are lost.

Thus, the continuously circulating medium in the closed circuit will be compressed, preheated, heated, is allowed to expand, dissipates losses and remaining heat and is cooled before it again is compressed.

The heating in the heat exchanger 19 is obtained by means of gas and/or liquid obtainable from whatever known process including a so called "heat pipe". For simplicity, it is here suggested a process with external combustion where a system comprising an air fan 21, an air preheater 22 and a combustion chamber 23 is disclosed.

The pressure in the system is controlled by means of a device connected to the circuit path by means of a conduit 24.

By changing the pressure level, it is possible to vary the power output, and it is of course necessary to maintain the circulating system filled up in spite of temperature and pressure variations, and it is also necessary to be able to empty the system when the plant is out of use.

The circulating medium can for instance be air, hydrogen or helium. Of course, the latter medium must be recovered. When air is used, which gives the lowest efficiency, the filling up can be made by means of an air compressor which is the most practical way in several applications. The pressure controlling means comprises a tank 25 which by means of a partition wall is divided into a high pressure chamber 25a and a low pressure chamber 25b. Communication between said chambers is obtained by means of a pump 26, and it is preferred that said pump is automatically controlled and feeds pressure medium from the low pressure chamber to the high pressure chamber.

It is obvious that in connection with larger plants, it is possible to have two completely separate tanks.

The plant also comprises a three way valve 27 which can be connected to the conduit 24 and either the high pressure chamber or the low pressure chamber of the tank 25.

When the plant is started up, it is assumed that the high pressure chamber 25a comprises a sufficient volume of high pressure medium for filling up working medium to the desired pressure in the circuit path. The pump 26 feeds medium from the low pressure chamber so that there is always medium for increasing the pressure of the system (up to a certain predetermined maximum value). If the pressure in the system is to be decreased, the medium is discharged to the low pressure chamber 25b.

It is to be noted, that the medium is heated adjacent the gable 11, and that the pump and the conduits 28, 29 to and from said pump are located adjacent the opposite gable 12, i.e. in the coldest sections of the system and as far as possible from the hottest system sections.

Figure 2:
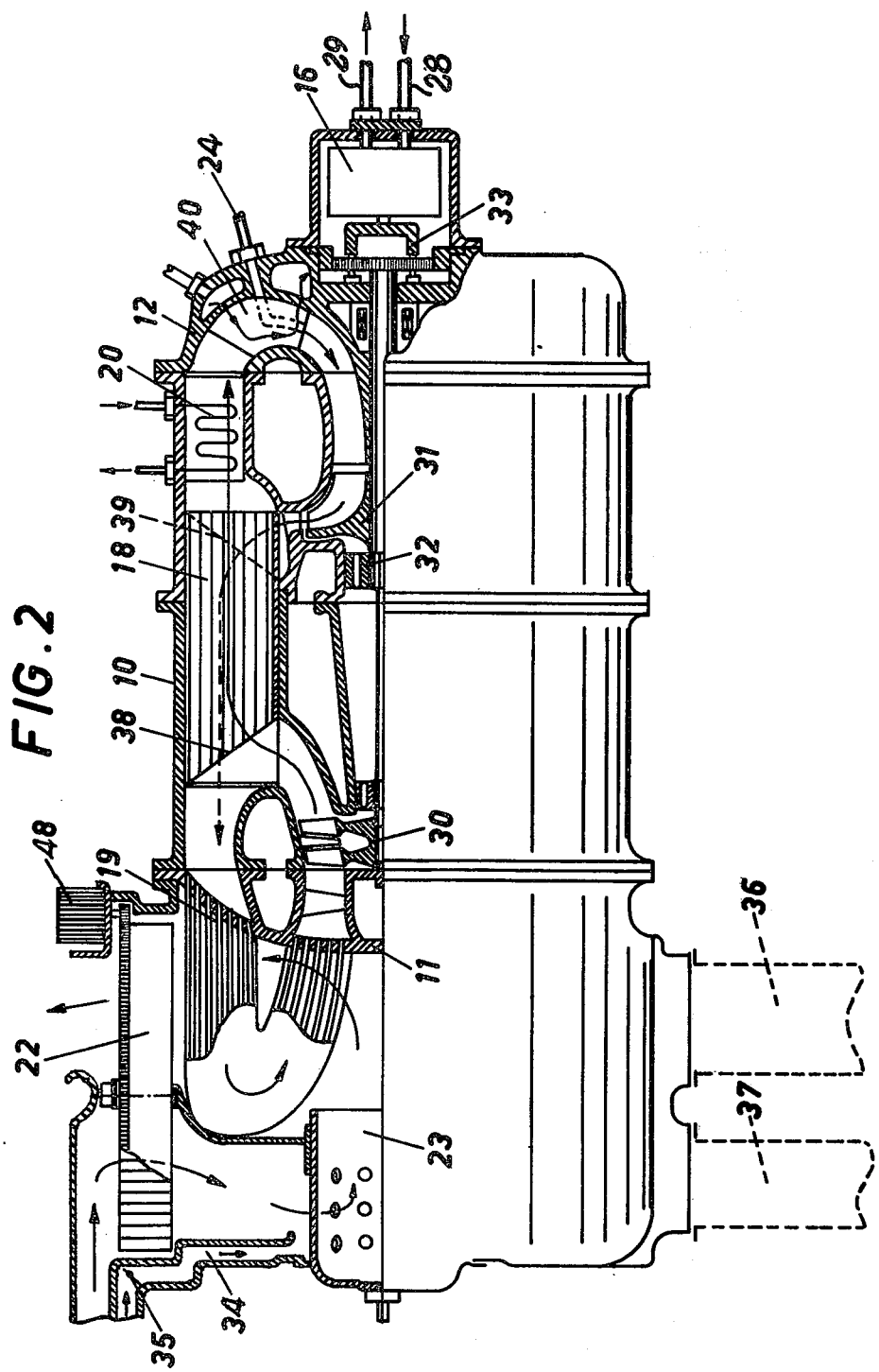
FIG. 2 is an enlarged longitudinal section (with portions removed) through a simple plant according to the invention.

Instead of having a pump, the turbine can be arranged for driving an electrical generator. At both types of power transfer, no sealings against a rotating shaft are necessary in contrary to mechanical transmissions. A closed gas turbine plant of the present kind does of course not imply that mechanical transmissions cannot be used, but since the entire casing will be under pressure, it will be more difficult to arrange sealings compared to the case where pipe conduits or cables for fixed mounting are arranged. When a generator having high rpm is used, said generator is to be installed in a chamber having subpressure in order to minimize draught. However, this draught does not imply any pronounced difficulties. In FIG. 2, it is disclosed a more detailed embodiment of a plant comprising a two stage turbine rotor 30 which drives a compressor rotor 31 mounted on the same shaft 32 as the turbine rotor. The shaft drives the hydraulic pump 16 via a simple transmission 33.

The middle portion of the casing has been given the same reference numeral 10 as in FIG. 1 and the two gables are denoted 11 and 12, respectively.

The heat exchanger 19 consists of a great number of U-shaped pipes, the two ends of each being connected to the gable 11 for forming an annular unit, in the central portion of which the combustion chamber 23 is mounted.

The air is supplied from a fan 21 (see FIG. 1) and is allowed to pass through an air preheater, in the present case being of the rotating type. The gases flow radially outwardly from the chamber between the heat exchanger pipes 19 and are collected in a chamber before passing the air preheater 22.

For controlling the air temperature at the combustion chamber, there is a by pass conduit 34 having a draught valve 35. A certain amount of non-preheated air can be fed through said conduit directly to the primary zone of the combustion chamber, or can be fed to be mixed with the preheated air.

When hot gases from an industrial process can be used, the heating of the circulating medium can be obtained entirely by said gases, or can be obtained in combination with heat from the combustion chamber and process gas being supplied and exhausted, respectively via conduits 36, 37. For instance said process gas can be gas from a heat battery.

The heat exchanger 18 is of a type known per se, comprising narrow parallel paths alternatingly arranged for heat dissipating and heat assimilating medium. By means of folded partitions, each of said paths is divided into parallel passages, the folds being arranged parallel to the flow direction of the medium.

At one gable end, the paths of the heat exchange 18 are closed and the paths are open in the adjacent part of the bottom portion and are alternatingly placed with their open ends facing at opposite directions. The folded partitions within the actual paths are obliquely cut as shown by the solid lines at 39 in the path being cut through on the drawing, and also being shown by dashed lines 39 at the path laying behind said first path.

Thus, the medium from the turbine flows in through openings in the paths of the heat exchangers, at the left end in the drawing, is deflected 90° at the arcuately cut wall 38 and passes axially out of the heat exchanger. During a substantial time of the passage, there is a counter flow of the medium in the heat dissipating and heat assimilating parts, respectively, which gives a maximum of efficiency.

The cooler 20 can be as large as the space admits, and it can be sufficient to arrange a portion thereof in the radial internal part of the loop, just before the inlet of the compressor 31.

Conveniently, the duct 24 from the pressure control system opens into the external wall or into any of the guide rails 40 arranged at positions upstreams to the compressor.

As can be seen from the drawing, the medium will pass the turbine and the compressor in opposite directions, and this requires that the axial forces in the rotating system are specially balanced, for instance by pressure equilibrium holes or sealings or by a balancing piston.

Figure 3:
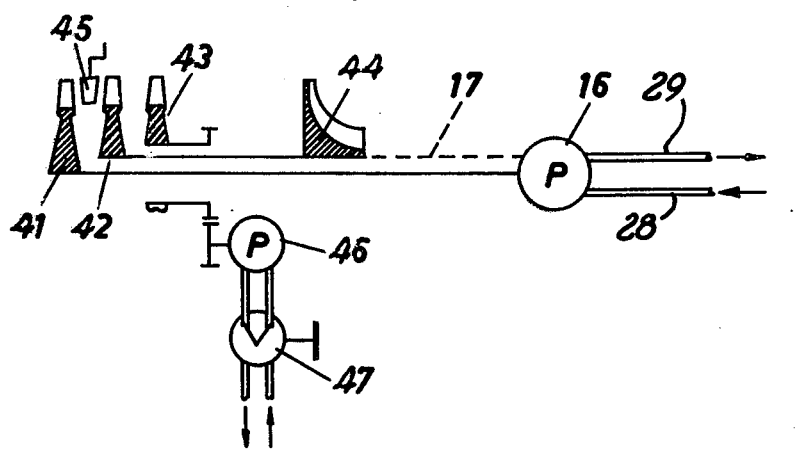
FIGS. 3 and 4 illustrate schematically more advanced rotor constructions which basically can be built into the casing shown in FIG. 2.
Figure 4:
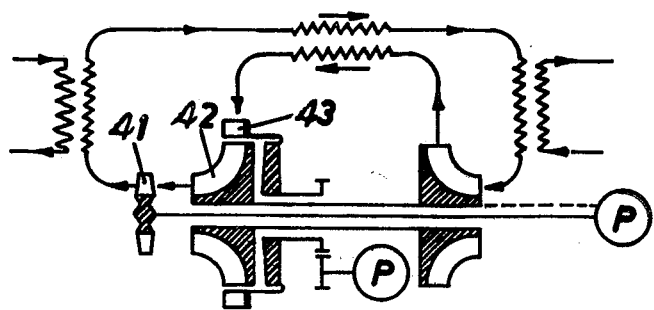

In FIGS. 3 and 4 there is shown a more complex rotor arrangement which can be easily built into a casing of the kind shown in FIG. 2. The arrangement according to FIG. 4 results in a good balancing out of the axial forces of the compressor rotor.

The turbine according to FIGS. 3 and 4 comprises three rotors 41, 42, 43, the first of which being directly connected to the pump 16, and the second being connected to the compressor 44. Obviously, the expansion can take place in two or several stages if desired, and as in FIG. 1, the turbine rotor 42 can be connected to the pump via a transmission 17.

The distribution of power output from the turbine stages 41, 42 and 43 is obtained by means of moveable input guide rails 45, arranged adjacent to one of the rotors, or is obtained by means of mutual power transfer between the rotors by means of a pressurized medium, which is obtained without over flow or slip, and thus, high efficiency is obtained.

The third turbine rotor drives a second hydraulic pump 46. This pump is controlled by a valve 47 in such a way that a recovery is obtained of the pressure drop which cannot be used in the two preceding turbine stages. The valve makes a recirculation to the pump possible, so that an amount of pressurized fluid just equal to the momentaneous power supply is taken out.

The pressure conduit from the pump 46 can be connected to the conduit from the pump 16, or can be connected to drive any auxiliary member, for instance the pump 26 in the pressure control device according to FIG. 1 and the motor 48 in FIG. 2 which drives the rotating heat exchanger.

The casing can be heat and sound insulated, and it is apparent that the well encapsuled rotating system has a very low noise level and can be designed for functioning free of vibrations in similarity to for instance steam turbines.

What concerns the control of combustion, the air preheating and the heater unit, the arrangement is such that the control system basically functions for giving the heater unit 19 a constant temperature independent of the power output and rpm. A suitable air-fuel ratio is obtained from signals from sensors, the heater unit and meters-sensors for the amount of fuel controlling the air flow via the fan and the amount of fuel via the fuel valve. With regard to the request of small amounts of $NO_x$, the control system is arranged for maintaining a substantially constant air-fuel ratio in the combustion zone.

There are further possibilities of controlling the amount of $NO_x$ by usng recirculation of exhaust gases, by varying the rotational speed of the regenerator, by varying the rpm of the hydraulic motor, and by means of by pass air from the heat exchanger.

What I claim is:

1. In a gas turbine plant comprising a compressor and a turbine, said compressor and said turbine being operatively connected within a pressure-proof casing by means of a driving shaft, said casing having a cylindrical mid portion and first and second domed gables sealing the ends of the mid portion, means within said casing forming a fluid circuit path for an operating fluid, said fluid circuit path interconnecting said compressor and said turbine so that the fluid will pass the same in opposite directions, the improvement comprising coil parts included in said fluid circuit path and directed outwardly from the first of said gables, means at said first gable for heating the fluid in said outwardly directed coil part, and an output end of said driving shaft being located at said second gable, remote from said heating means.

2. The gas turbine according to claim 1, in which said output end of the driving shaft terminates inwardly of said second gable and as far as possible from the said heating means, and non-rotating power means operatively connected to said driving shaft and arranged to pass from said casing.

3. The gas turbine according to claim 1 including a conduit for pressurizing the fluid, said conduit being operatively connected to an inlet side of said compressor.

* * * * *